(12) United States Patent
Parandekar et al.

(10) Patent No.: US 11,669,432 B1
(45) Date of Patent: Jun. 6, 2023

(54) COMPILER-ENABLED APPLICATION EXECUTION TRACKING

(71) Applicant: Cisco Technology, Inc., San Jose, CA (US)

(72) Inventors: Harshavardhan Parandekar, San Jose, CA (US); Pratap Pereira, Saratoga, CA (US); Tapraj Singh, Danville, CA (US); Jeffrey yi dar Lo, Cupertino, CA (US); Zhijian Zhang, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/932,363

(22) Filed: Jul. 17, 2020

(51) Int. Cl.
*G06F 11/36* (2006.01)
*G06F 8/41* (2018.01)

(52) U.S. Cl.
CPC ............ *G06F 11/3624* (2013.01); *G06F 8/44* (2013.01)

(58) Field of Classification Search
CPC .......................... G06F 11/3624; G06F 8/41–49
USPC ................................. 717/124–130, 140–161
See application file for complete search history.

(56) References Cited

U.S. PATENT DOCUMENTS

| | | | | |
|---|---|---|---|---|
| 6,249,907 B1* | 6/2001 | Carter | .................. | G06F 11/3624 714/E11.209 |
| 7,047,519 B2* | 5/2006 | Bates | .................... | G06F 11/362 714/34 |
| 8,997,058 B2 | 3/2015 | Bohnet et al. | | |
| 9,207,969 B2 | 12/2015 | Krajec | | |
| 9,223,679 B1 | 12/2015 | Ho et al. | | |
| 9,389,992 B2 | 7/2016 | Gataullin et al. | | |
| 10,191,836 B2 | 1/2019 | Dracea et al. | | |
| 2003/0061599 A1* | 3/2003 | Bates | .................... | G06F 11/362 717/129 |
| 2003/0106045 A1* | 6/2003 | Arnold | ................ | G06F 11/3644 717/129 |
| 2010/0095281 A1* | 4/2010 | Raber | ................... | G06F 9/4484 717/129 |

OTHER PUBLICATIONS

Carlsson, Mats, The SICStus Emulator, Swedish Institute of Computer Science Technical Report, Sep. 1991, 33 pages, [retrieved on Aug. 26, 2021], Retrieved from the Internet: <URL:http://www.diva-portal.org/smash/record.jsf?pid=diva2%3A1041685&dswid=2740>.*

Al-Tahat, Khalid, et al., A Novel Method for Live Debugging of Production Web Applications by Dynamic Resource Replacement, International Journal of Computer, Information, Systems and Control Engineering vol. 8 No. 9, 2014, 5 pages, [retrieved on Jan. 11, 2023], Retrieved from the Internet: <URL:http://dl.acm.org/>.*

* cited by examiner

*Primary Examiner* — Geoffrey R St Leger
(74) *Attorney, Agent, or Firm* — Lee & Hayes, P.C.

(57) ABSTRACT

This disclosure describes techniques to compile source code corresponding to a portion of a software program. The techniques include generating first object code by processing the source code. Based at least in part on processing the source code, generating second object code, wherein the second object code, when executed by one or more processors, causes the one or more processors to perform an operation unconditionally bound to a unique identifier of the operation. The described techniques further include generating an indication of a mapping of the unique identifier to the portion of the software program.

20 Claims, 10 Drawing Sheets

```
static void
uicon_remref (uicon_t** c)
{
    bimos_assert(c);
    uipeer_check_con(*c);

DEBUG("Removing a reference for correction %p", *c);

/* uicon free does the job for us */
    (*c)->con_refs -= 1;
    if ((*c)->con_refs < 1) { CRFT_CNTR(BB_1);  ⟵ 702
        DEBUG("Last reference for %p removed, freeing", *c);
        uicon_free(c);
    } else { CRFT_CNTR(BB_2);  ⟵ 704
        DEBUG("Connection %p has %p references outstanding", *c, (*c)->con_refs);
    }
}
```

```
dump of assembler code for function X

0xb21520    push    %rbp
0xb21521    push    %r15
0xb21523    push    %r14
0xb21525    push    %r13
0xb21527    push    %r12
0xb21529    push    %rbx
0xb2152a    sub     $0x168, %rsp
0xb21531    mov     %esi, %r13d
0xb21534    mov     %rdi, %r12
0xb21537    incq    0x231332(%rip)
0xb2153e    lea     0x14(%rsp), %rdi
0xb21543    mov     $0x4, %esi
0xb21548    mov     $0x2, %edx
0xb2154d    incq    0xf019492(%rip)
0xb21552    movl    $0x0, 0x14(%rsp)
• • •
```

COMPILER-ENABLED APPLICATION EXECUTION TRACKING

TECHNICAL FIELD

The present disclosure relates generally to execution tracking in software systems and, more specifically, to a methodology for efficient compiler-enabled execution tracking.

BACKGROUND

Debugging and analysis of software systems and networks of systems can be difficult. For example, it can be difficult to reproduce the conditions in which an error occurred, to determine the cause of the error. Furthermore, it may not be acceptable or feasible to debug an issue on a live (in service) customer system.

Some techniques to generate "always-available" debugging/analysis information on a live customer system significantly affect the performance of an executing software system. For example, such techniques may incur overhead that significantly affects execution speed, binary code size, and memory usage of the executing software system. Other techniques may not have a significant effect on the performance of the executing software system but, on the other hand, may not provide adequate information for debugging/analysis of the executing software system.

It may be useful to provide techniques to efficiently generate adequate information for debugging/analysis of an executing software system, without significantly affecting the performance of the executing software system.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

This disclosure describes techniques to compile source code corresponding to a portion of a software program. The techniques include generating first object code by processing the source code. The techniques include generating second object code based at least in part on processing the source code, wherein the second object code, when executed by one or more processors, causes the one or more processors to perform an operation unconditionally bound to a unique identifier of the operation. The described techniques further include generating an indication of a mapping of the unique identifier to the portion of the software program.

This disclosure also describes techniques for one or more processors to execute object code resulting from compiling source code that corresponds to a portion of a software program. The techniques include executing a first portion of the object code and, in conjunction with executing the first object code portion, performing an operation unconditionally bound to a unique identifier of the software program portion by executing a second portion of the object code. For example, the second object code portion may correspond to a debug instruction included in the source code.

Additionally, the techniques described herein may be performed by a system and/or device having non-transitory computer-readable media storing computer-executable instructions that, when executed by one or more processors, performs the methods described herein.

Example Embodiments

Having always-available rich information, such as code coverage information, about an executing software system may be valuable for debugging and analyzing the executing software system. For example, it may not be necessary to reproduce an error-inducing environment, on an in-service or testbed system, in order to perform a root cause analysis of execution-time errors.

As another example, if the software system is discovered to have a security vulnerability, which is typically tied to particular code in the overall system, developers can separately analyze each executing software system to gauge the level of exposure that executing software system has to the security vulnerability. As yet another example, some customers may resist installing an update to an in-the-field software system, typically due to a concern that the updated software will introduce errors into a system that otherwise is operating (or appears to be operating) without error. In such a situation, developers can analyze a customer's in-the-field software system to provide visibility into whether portions of the software system that are being modified in the update are being exercised by the customer's in-the-field software system. This additional information may be useful to the customer in deciding whether to install a particular update.

There are a number of approaches to supporting debug and analysis of in-the-field software systems. In many examples, the debug and analysis process utilizes a special configuration of the software system. The special configuration may include the software system executing on testbed hardware. Particularly for embedded software systems, such as those embedded in network devices or other specialized hardware, it may be difficult to reproduce the operating environment of an actual in-the-field software system on the testbed hardware environment. This may be particularly so when the software system is being operated in the field by a customer, and the customer may not have enough knowledge about how the system is designed to operate to be able to debug and analyze the software system. Conversely, while the system vendor may have knowledge about how the system is designed, the vendor may not have sufficient access to the customer environment to be able to satisfactorily address a customer-specific issue.

In some examples, a debug and analysis function is incorporated directly into an actual in-the-field software system. One advantage of such an incorporated debug and analysis function may be that it produces data that is indicative of the software system as it is operating in the field. In order to attain such an advantage, however, the incorporated debug and analysis function may introduce so much overhead to the primary function of the software system that "always on" use of the incorporated debug and analysis function is untenable.

For example, many issues with embedded software system are a result of memory constraints—program memory size and/or data memory size. Memory overhead of a debug and analysis function incorporated directly into an actual in-the-field software system may exacerbate the memory constraints. As another example, in many cases, an embedded software system is configured to react to events in the environment that are occurring asynchronously and to which the embedded software system is designed to timely respond. A high execution overhead debug and analysis function incorporated directly into an actual in-the-field software system may distort the ability of the in-the-field system to adequately respond to asynchronous environmental events.

While the above discussion has been with respect to embedded software systems, many of these issues may be present even in software systems that are not embedded. In practice, a high-overhead, incorporated debug and analysis function may be selectively turned on instead of being "always on," but this can ameliorate some of its advantage. For example, when such an analysis and debug function is not on, it is not providing information from which the software system may be debugged and analyzed. Furthermore, when the high overhead system is turned on, its presence may actually distort the operation of the software system, so that the information the high-overhead analysis and debug function provides is not representative of how the software system operates when the high-overhead analysis and debug function is not on.

It may therefore be advantageous to utilize a technique for debugging that may be "always on" in an in-the-field software system but that is not high overhead from an execution and memory standpoint. For example, instructions for execution tracking may execute in an extremely lightweight manner. A compiler may generate mapping information so that the results of the lightweight execution tracking instructions may allow for very powerful debugging. The debugging may be "always on," which can reduce or eliminate the necessity to reproduce the inputs and/or environment that caused an error. Even if the software is operating without apparent error, always-on execution tracking can be useful for auditing purposes.

For example, a debug operation may be unconditionally bound to a unique identifier of the operation, to generate a result of the debug operation. For example, the debug operation may be an operation to increment a counter in memory each time the debug operation is executed. As another example, the debug operation may be an operation to store in memory and/or to output an indication each time the debug operation is executed. The result of the debug operation may be unconditionally bound to a unique identifier. For example, the result of the debug operation may be unconditionally stored into a unique memory location. A compiler (and/or linker) may encode the unique memory location directly into the object code that corresponds to the debug operation. As another example, the object code corresponding to the debug operation may cause one or more processors executing the object code to output an indication each time the debug operation is executed, the indication being unconditionally bound to a unique identifier.

With the debug operation being unconditionally bound to a unique identifier of the operation, and object code corresponding to the debug operation not including conditional operations, the debug operation is extremely lightweight. That is, the debug operation may minimally affect the operation of an operating device such that, for example, the debug operation may be nominally "always on" such that the debug operation is executed as a matter of course, even in systems such as networks deployed at an end customer.

The debug operation, being extremely lightweight, may be used liberally. For example, the debug operation may be executed each time any function is executed. As another example, the debug operation may be executed each time a memory access is executed. In some examples, every processor execution operation may be observed with the debug operation. A compiler may be configured to include appropriate debug operations according to user input or other configuration information provided to the compiler.

The compiler may populate a bindings memory with metadata from which a process may associate the unique identifier, to which a result is unconditionally bound. The compiler may populate the bindings memory to indicate an operation as observed in the source code and to which the debug operation corresponds. For example, if the unique identifier is a memory location, the compiler may populate the bindings memory with metadata that correlates the memory location with a textual indication of a function name and/or other indicator of the operation, as observed in the source code and to which the result of the debug operation corresponds. As another example, the unique identifier may be a globally unique identifier output each time the debug operation is executed. In this example, the compiler may populate the bindings memory with metadata that correlates the globally unique identifier with a textual indication of a function name and/or other indicator of the operation to which the result of the debug operation corresponds. Thus, for example, software debug/analysis tools can correlate the counter in the memory location and/or the output indication to an operation as observed in the source code.

The techniques described herein may be performed by a system and/or device having non-transitory computer-readable media storing computer-executable instructions that, when executed by one or more processors, performs the methods described herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
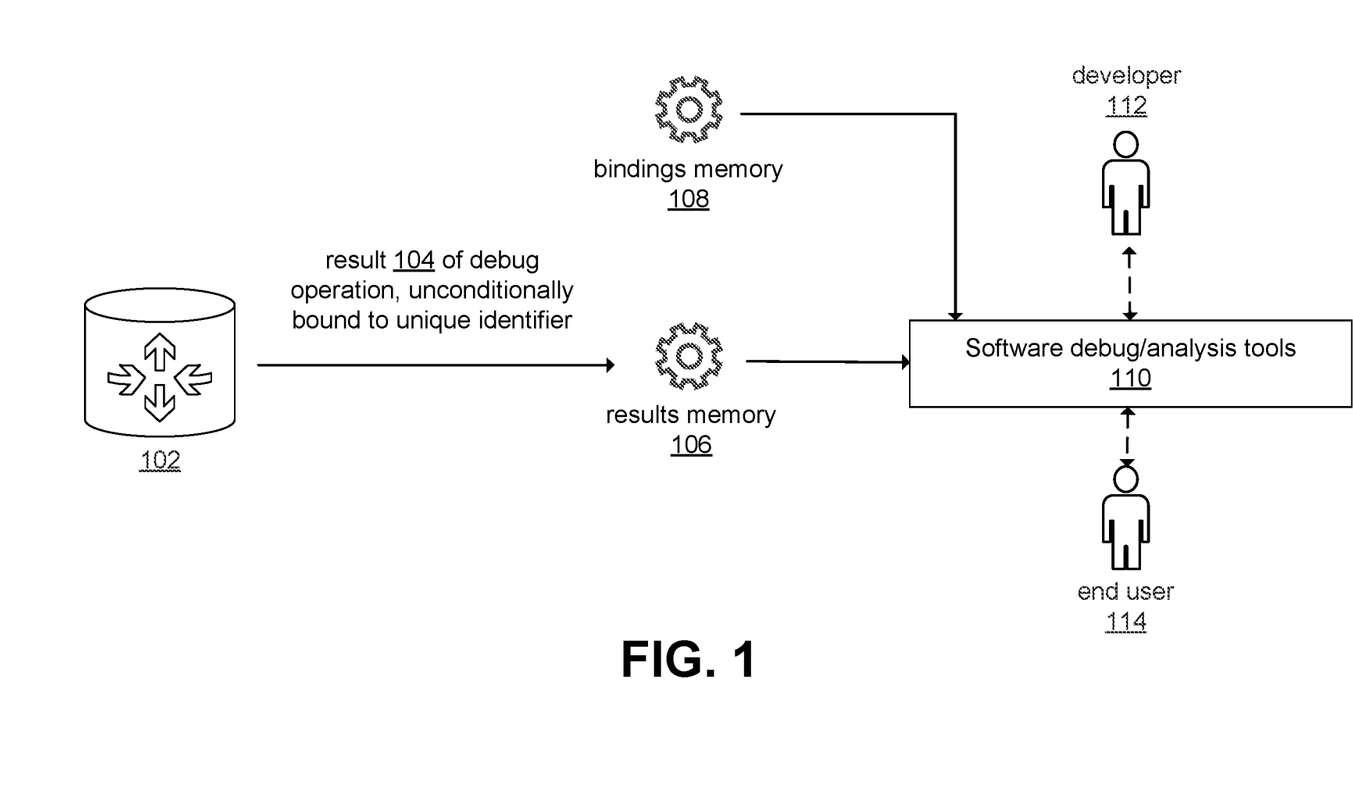
FIG. 1 is a diagram illustrating an example system that includes an operating device under observation.

FIG. 1 is a diagram illustrating an example system 100 that includes an operating device 102 under observation. For example, the operating device 102 may be a device or system that is deployed in an actual operating environment. For example, the operating device 102 may be a device such as a network router, switch or access point that is operating in a network deployed by an end customer of the supplier of the operating device 102. The operating device 102, however, is not limited to being a device operating in a network. The operating device 102 may be any computing device or system having at least one processor that may be configured to execute object code.

Source code is a portion of a computer program that includes computer code written in a human-readable language, such as the C programming language. Typically, a compiler compiles the source code into object code. Object code is a portion of machine code that is not yet a complete program. Rather, the object code includes machine code for one particular library or module that will make up a completed product. The object code may contain placeholders or offsets not found in the machine code of a completed program. A linker may resolve those placeholders and offsets in the process of linking together object code for different libraries and/or modules.

The operating device 102 (e.g., one or more processors of the operating device 102) is configured to execute object code corresponding to a debug operation. The result of the debug operation is unconditionally bound to a unique identifier of the operation, to generate a result 104 of the debug operation.

For example, the debug operation may be an operation by the operating device 102 to increment a counter in memory each time the operating device 102 executes machine code corresponding to a particular operation or type of operation, as observed in the source code. As another example, the debug operation may be an operation by the operating device 102 to store in memory and/or to output an indication each time the operating device 102 executes machine code corresponding to a particular operation or type of operation, as observed in the source code.

For example, the particular operation or type of operation in the source code may be executing a particular function (or any function), as observed in the source code. As another example, the particular operation or type of operation in the source code may be executing a particular memory access instruction (or any memory access instruction). As yet another example, the particular operation or type of operation in the source code may be executing a particular type of instruction (or any instruction).

As discussed above, the result 104 of the debug operation may be unconditionally bound to a unique identifier. For example, the result 104 of the debug operation may be unconditionally stored into a unique memory location. For example, a compiler (and/or linker) may encode the unique memory location directly into the object code that corresponds to the debug operation. As another example, the object code corresponding to the debug operation may output an indication each time the operating device 102 executes object code corresponding to a particular operation or type of operation, as observed in the source code, unconditionally bound to a unique identifier. For example, a compiler (and/or linker) may encode the unique identifier directly into object code that corresponds to the debug operation. The operating device 102 may output the unique identifier, possibly along with other information, as a result of executing the debug operation.

Because the result 104 of the debug operation is unconditionally bound to a unique identifier of the operation, and the machine code corresponding to the debug operation does not include conditional operations, the debug operation is extremely lightweight. That is, the debug operation minimally affects the operation of the operating device 102 such that, for example, the debug operation may be nominally "always on." The debug operation may be executed as a matter of course, even in systems such as networks deployed at an end customer.

Referring still to FIG. 1, the result 104 of the debug operation, unconditionally bound to a unique identifier, is stored into a results memory 106. The results memory 106 may, for example, be a memory of the system 100 accessible by software debug/analysis tools 110 that may process the result 104 (and/or many other results of debug operations) to gain insight into the operation of the operating device 102. In some examples, the result 104 of the debug operation may be copied from a memory that is incorporated into the operating device 102 into the results memory 106. As another example, if the operating device 102 outputs an indication as a result of the debug operation, the output indication may be stored in the results memory 106. In some examples, the results memory 106 may be tightly coupled to the operating device, and software debug/analysis tools 110 may access memory that is incorporated into the operating device 102.

The system 100 also includes a bindings memory 108. The compiler (and/or linker) populates the bindings memory 108 with metadata from which a process may associate the unique identifier, to which a result 104 is unconditionally bound, with the operation as observed in the source code and to which the debug operation corresponds. For example, the software debug/analysis tools 110 may include the process that associates the unique identifier with an operation as observed in the source code.

As illustrated in FIG. 1, the software debug/analysis tools 110 may be tools used by a developer 112 of software executed by the operating device 102 and/or by an end user 114 of the operating device 102, for example. For example, a developer 112 or end user 114 may use the software debug/analysis tools 110 to perform security risk analysis, system test coverage and/or memory leak debugging. Support for the debugging/analysis may be built into the source code of the software executed by the operating device 102, so the debugging analysis may be performed on the software as it will be or is being executed by the operating device 102 in an end user environment.

Referring again to the bindings memory 108, if the unique identifier is a memory location, the compiler (and/or linker) may populate the bindings memory 108 with metadata that correlates the memory location with a textual indication of a function name and/or other indicator of the operation, as observed in the source code, to which the result 104 of the debug operation corresponds. As a result, software debug/analysis tools 110 can correlate the contents of the memory location, such as a counter that is incremented by the debug operation each time the operating device 102 executes object code corresponding to an operation as observed in the source code, to the operation as observed in the source code.

As another example, the unique identifier may be a globally unique identifier that the operating device 102 outputs each time the operating device 102 outputs the result 104 of the debug operation. In this example, the compiler (and/or linker) may populate the bindings memory 108 with metadata that correlates the globally unique identifier with a textual indication of a function name and/or other indicator of the operation, as observed in the source code, to which the result 104 of the debug operation corresponds. As a result, software debug/analysis tools 110 can correlate the indication, that the operating device 102 outputs each time the operating device 102 executes object code corresponding to an operation as observed in the source code, to the operation as observed in the source code.

Figure 2:
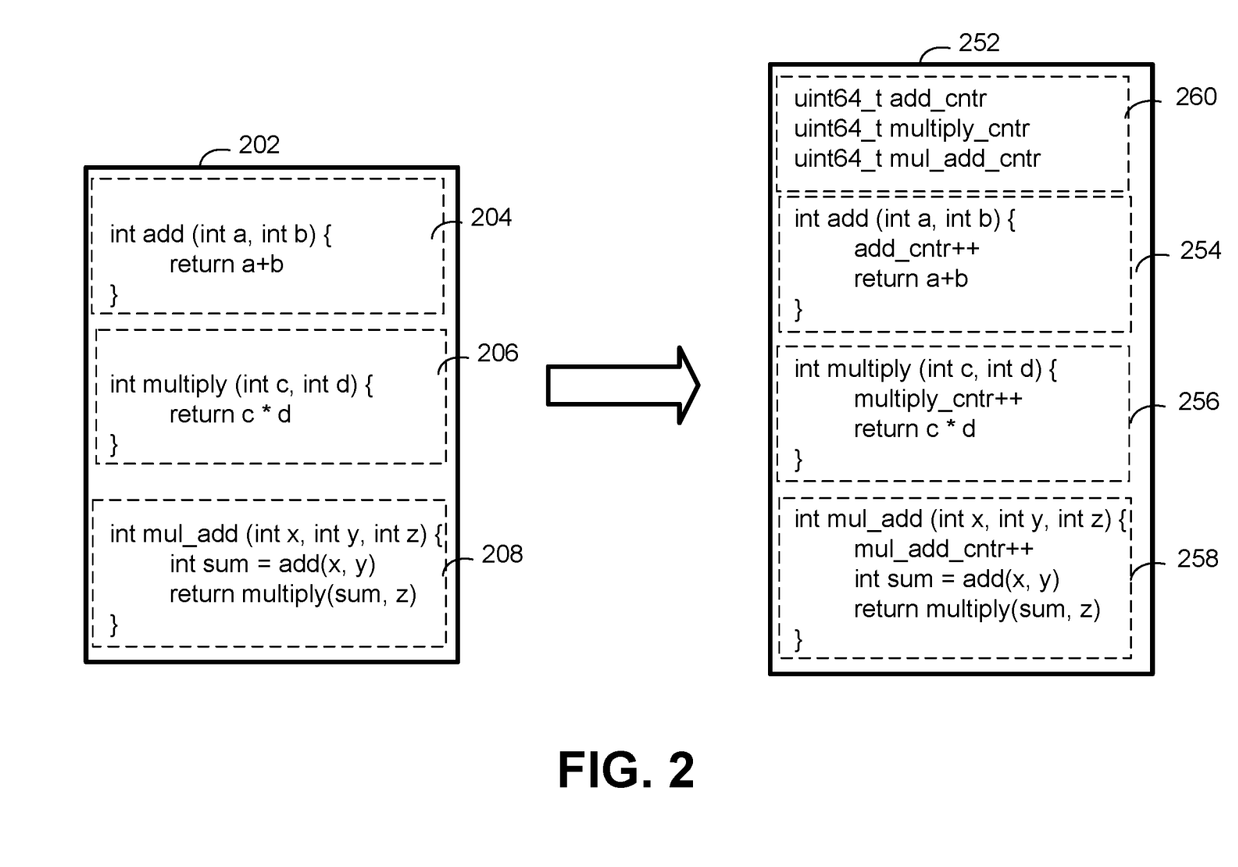
FIG. 2 illustrates an example of source code as written by a developer and a version of the source code, illustrating how a compiler (and/or linker) conceptually modifies the source code to include a debug operation.

FIG. 2 illustrates a simplified example of source code 202 as written by a developer and a version 252 of the source code 202, illustrating how a compiler (and/or linker) conceptually modifies the source code 202 to include a debug operation. As discussed above, the compiler (and/or linker) generates object code corresponding to a debug operation, and the result of the debug operation is unconditionally bound to a unique identifier of the operation, to generate a result of the debug operation. Referring to FIG. 2, the developer has written source code 202 that includes three functions—an add function 204, a multiply function 206 and a multiply-add function 208. This is a simplified example and, in many cases, the source code and included functions are likely to be much more complex.

The conceptually modified source code 252 is not actual source code but, rather, is source code that conceptually illustrates, at a source code level, how a compiler may generate object code corresponding to the source code 202. The conceptually modified source code 252 includes an add function 254 corresponding to the add function 204, a multiply function 256 corresponding to the multiply function 206, and a multiply-add function 258 corresponding to the multiply-add function 208. Taking the add function 254 as an example, the conceptually modified source code for the add function 254 includes a debug operation (add_cntr++) that increments the "add_cntr" counter in memory each time the operating device 102 executes object code corresponding to the add function 254. The operating device 102, executing the add_cntr++ operation, increments the value at a unique memory location that is unconditionally bound to the add_cntr++ operation. The operating device 102 executes the add_cntr++ operation each time the operating device 102 executes the add function 204, so the value at the unique location that is unconditionally bound to the add_cntr++ operation is an indication of how many times the add function 204 has been executed. As is discussed later, more precisely, the operating device 102 executes object code corresponding to the add_cntr++ source code operation each time the operating device 102 executes object code corresponding to the add function 204 source code.

Referring still to FIG. 2, the conceptually modified source code 252 for the multiply function 256 includes a debug operation (multiply_cntr++) that increments the "multiply_cntr" counter in memory each time the operating device 102 executes object code corresponding to the multiply function 206. The operating device 102, executing the add_cntr++ operation, increments the value at a unique memory location that is unconditionally bound to the add_cntr++ operation. The operating device 102 executes the multiply_cntr++ operation each time the operating device 102 executes the multiply function 204, so the value at the unique location that is unconditionally bound to the multiply_cntr++ operation is an indication of how many times the multiply function 204 has been executed. As is discussed later, more precisely, the operating device 102 executes object code corresponding to the multiply_cntr++ source code operation every time the operating device 102 executes object code corresponding to the multiply function 204 source code.

The conceptually modified source code 252 for the multiply-add function 258 also includes a debug operation (mul_add_cntr++) that increments the "mul_add_cntr" counter in memory each time the operating device 102 executes object code corresponding to the multiply-add function 208. The operating device 102, executing the mul_add_cntr++ operation, increments the value at a unique memory location that is unconditionally bound to the mul_add_cntr++ operation. The operating device 102 executes the mul_add_cntr++ operation each time the operating device 102 executes the multiply-add function 208, so the value at the unique location that is unconditionally bound to the mul_add_cntr++ operation is an indication of how many times the multiply-add function 208 has been executed. As is discussed later, more precisely, the operating device 102 executes object code corresponding to the mul_add_cntr++ source code operation every time the operating device 102 executes object code corresponding to the multiply-add function 208 source code.

As further shown in FIG. 2, the conceptually modified source code 252 also includes a declarations portion 260 that includes declaration statements that specify the add_cntr value, located at the unique location that is unconditionally bound to the add_cntr++ operation, the multiply_cntr value, located at the unique location that is unconditionally bound to the multiply_cntr++ operation, and the mul_add_cntr, that is unconditionally bound to the mul_add_cntr++ operation. In the declarations portion 260, the add_cntr value, the multiply_cntr value and the mul_add_cntr value are all declared as unsigned integer.

Figure 3:
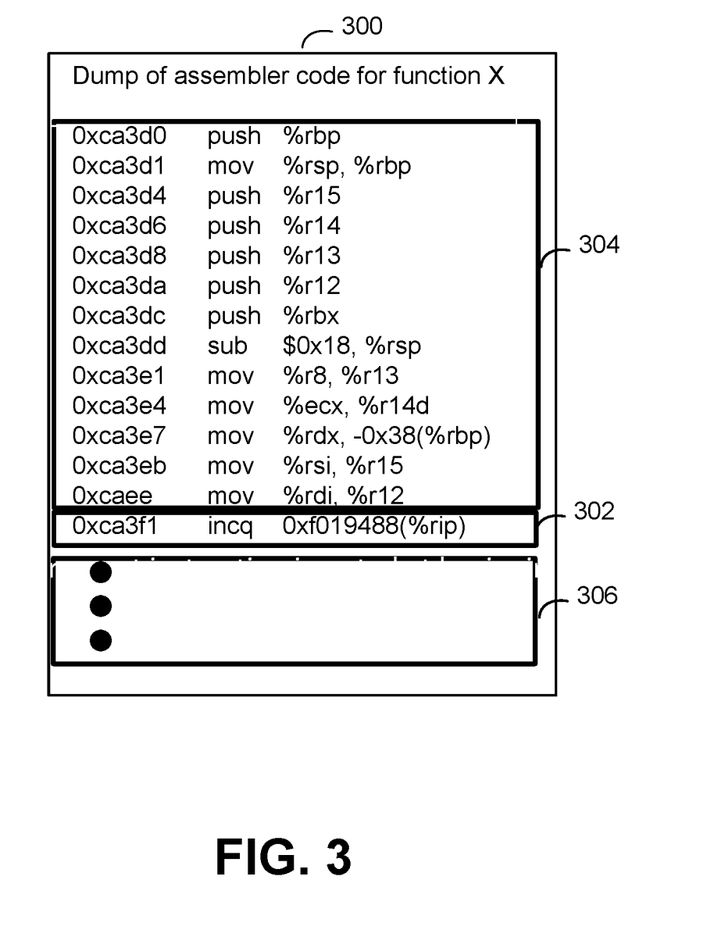
FIG. 3 illustrates an example machine code fragment, for execution by the operating device, that includes a debug operation added by a compiler compiling source code corresponding to an arbitrary function "X."

FIG. 3 illustrates an example assembler-code version of a machine code fragment 300, for execution by the operating device 102, that includes a debug operation 302 added by a compiler (and/or linker) compiling source code corresponding to an arbitrary function "X." The debug operation 302 is a processor-native increment function ("incq") that, when executed by the operating device 102, increments a value at a unique location that is unconditionally bound to the increment function. In particular, the increment function increments a value at the address that is the argument to the increment function. In the FIG. 3 example, the debug operation 302, when the operating device 102 executes it, increments a value at an address that is 0xf019488 plus the value of the instruction pointer (% rip). The instruction pointer typically points to the next instruction to execute after the current instruction which, in case of the debug instruction 302, is the instruction after the debug instruction 302. The compiler (and/or linker) populates the bindings memory 108 with metadata from which a process may associate the memory location, to which the result of the debug instruction 302 is unconditionally bound, with the function X which is the operation, as observed in the source code, to which the debug operation 302 corresponds.

Referring still to FIG. 3, the instructions 304 are instructions to initialize the function X (e.g., creating a new stack frame) and to perform some of the substantive instructions of the function X, and the instruction 306 follow the debug operation 302. So long as the debug instruction 302 is prior to any conditional instructions, such as any conditional branch instructions, the operating device 102 will execute the debug instruction 302 each time the function X is executed. Using information in the bindings memory 108, software debug/analysis tools 110 may understand that the value at the destination memory location of the incq debug instruction 302 corresponds to the function X. The software debug/analysis tools 110 may process additional metadata in the bindings memory 108, which may be provided to the bindings memory 108 by the compiler, to determine that the value at the destination memory location of the incq debug instruction 302 not only corresponds to the function X, but corresponds to the number of times the operating device 102 has executed the function X.

As discussed above, the compiler (and/or linker) controls how debug instructions are added to machine language that corresponds to developer-written source code, such as the source code 202. Thus, the compiler (and/or linker) knows what information to include in the bindings memory 108 so that the software debug/analysis tools 110 may understand how to interpret the value at a particular location in the results memory 106. With respect to FIG. 3, the compiler knows what information to include in the bindings memory 108 so that software debug/analysis tools 110 may understand the value at the destination memory location of the incq debug instruction 302 corresponds to the number of times the operating device 102 has executed the function X.

Figure 4:
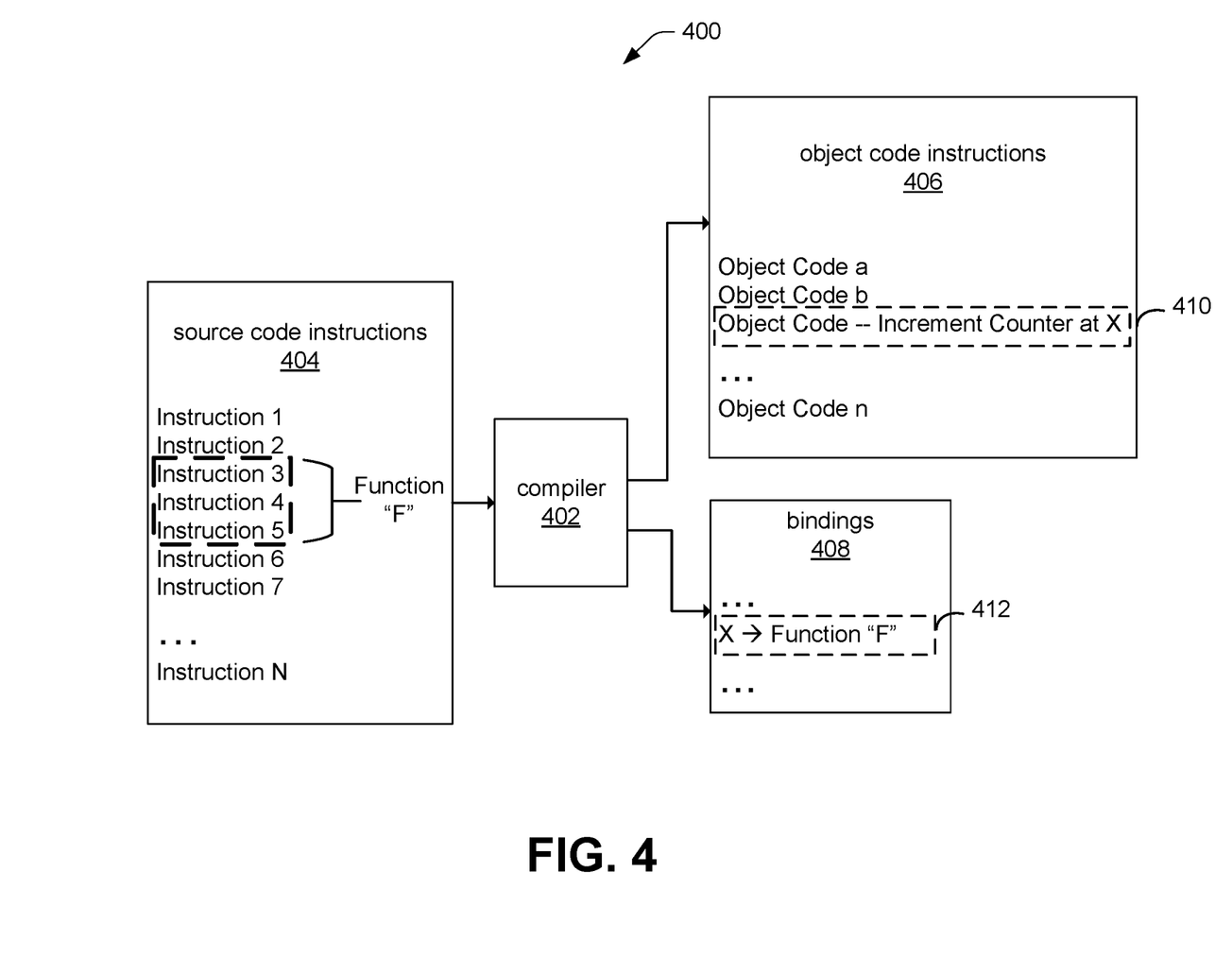
FIG. 4 illustrates how a compiler may process source code instructions to generate object code instructions and bindings.

FIG. 4 illustrates how a compiler 402 may process source code instructions 404 to generate object code instructions 406 and bindings 408. The source code instructions 404 include individual source code instructions Instruction 1, Instruction 2 and so on to Instruction N. Based at least in part on a configuration according to which the compiler operates, the compiler generates object code instructions 404 including object code instructions Object Code a, Object Code b and so on to Object Code n. There may not be a one-to-one correspondence between the source code instructions 404 and the object code instructions 406. For example, there may be many times more object code instructions 406 than there are source code instructions 404. In addition to generating object code instructions 406 to accomplish the intent of the source code instructions 404, the compiler 402 generates also a debug object code instruction 410. For example, the debug object code instruction 410 may be placed relative to others of the object code instructions 406 such that the operating device 102, executing the debug object code instruction 410, increments a counter. The counter is at a memory location X to which the debug object code instruction 410 is unconditionally bound. The operating device 102 may, for example, increment the counter each time the operating device 102 executes ones of the object code instructions 406 corresponding to invoking a source code function "F" that is comprised of Instruction 3, Instruction 4 and Instruction 5.

The compiler 402 also generates the bindings 408 to include a mapping of the memory location X to a portion of the source code instructions 404. In the example of incrementing the counter each time the operating device 102 executes ones of the object code instructions 406 corresponding to invoking a source code function "F," the bindings 408 may include a mapping 412 of the memory location X to the source code function "F."

In some examples, a variable name for a value in the mapping is generated according to a known pattern, based at least in part on the function name, which can help to minimize the amount of metadata in the mapping. For example, the known pattern may be a hierarchical representation of the Function F within the overall source code of a system.

Figure 5:
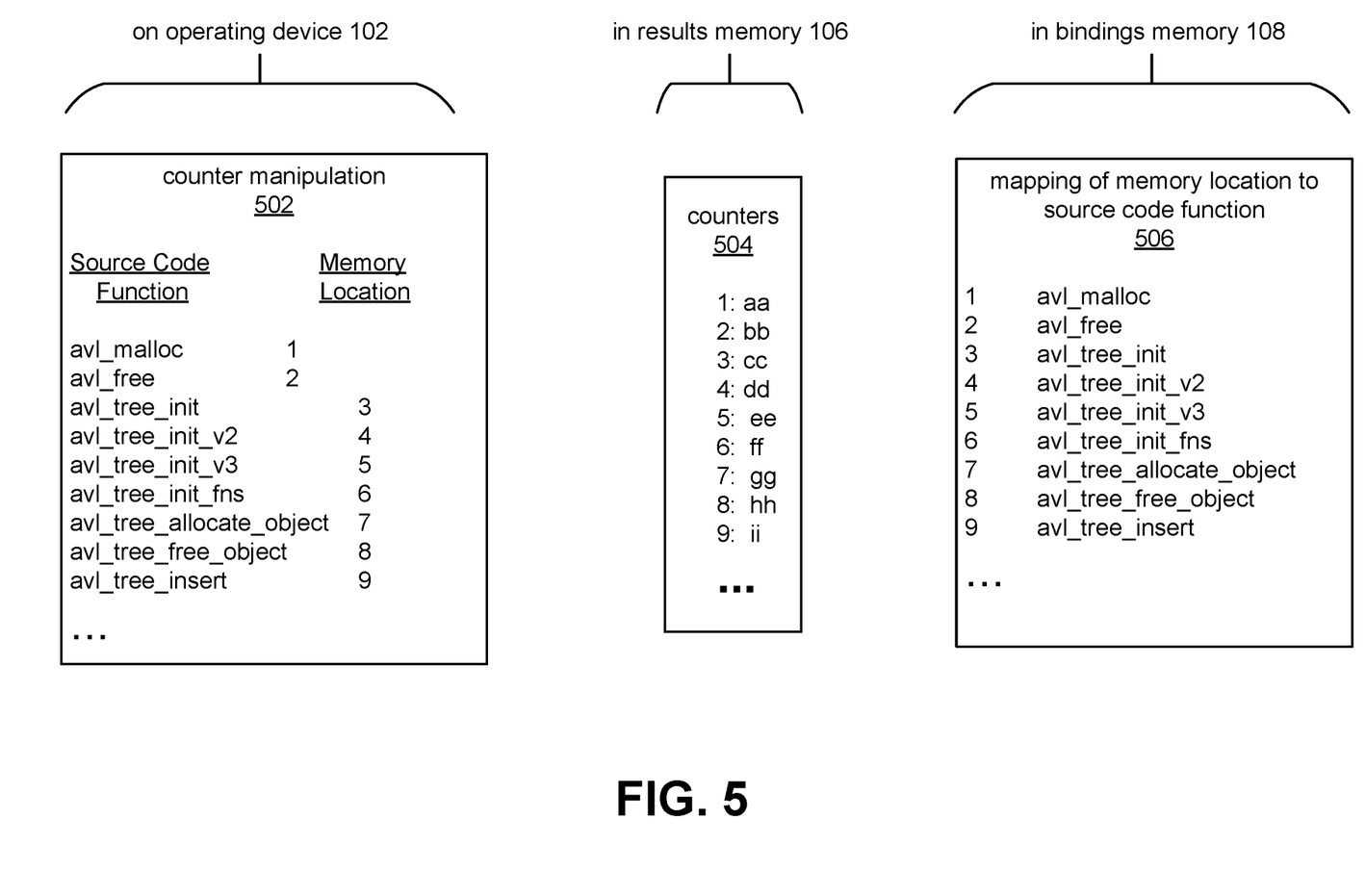
FIG. 5 is a diagram further illustrating a relationship between counter manipulation, the locations of the counters and a mapping of the locations to source code.

FIG. 5 is a diagram further illustrating a relationship between counter manipulation, the locations of the counters and a mapping of the locations to source code. Referring to FIG. 5, the operating device 102 includes counter manipulation processing 502 that operates as a result of the operating device 102 executing object code instructions corresponding to various source code functions. As illustrated in FIG. 5, the source code functions may include avl_malloc, avl_free, avl_tree_init, and so on. Furthermore, the counters may be located at respective memory location 1, 2, 3 and so on.

The results memory 106 includes the counters 504 at memory locations 1, 2, 3 and so on that the operating device 102 manipulates as a result of the operating device 102 executing object code instructions corresponding to various source code functions. For example, software debug/analysis tools 110 may access the counters 504 at memory locations 1, 2, 3 and so on in the results memory 106. As discussed above, each of the memory locations 1, 2 3 and so on is unconditionally bound to one or more source code instructions corresponding to a debug operation by which the operating device 102 manipulates the counter at the respective memory location.

The compiler (and/or linker) generates the mapping 506 of memory location to source code—in the FIG. 5 example, to functions in the source code—and stores the mapping in the bindings memory 108. Software debug/analysis tools 110 determine the context of one of the counters 504, at a particular memory location, at least in part by consulting the mapping 506. For example, by consulting the mapping 506 in the bindings memory 108, software debug/analysis tools may determine that the counter at memory location 5 in results memory 106 corresponds to the source code function named "avl_tree_init_v3."

Figure 6:
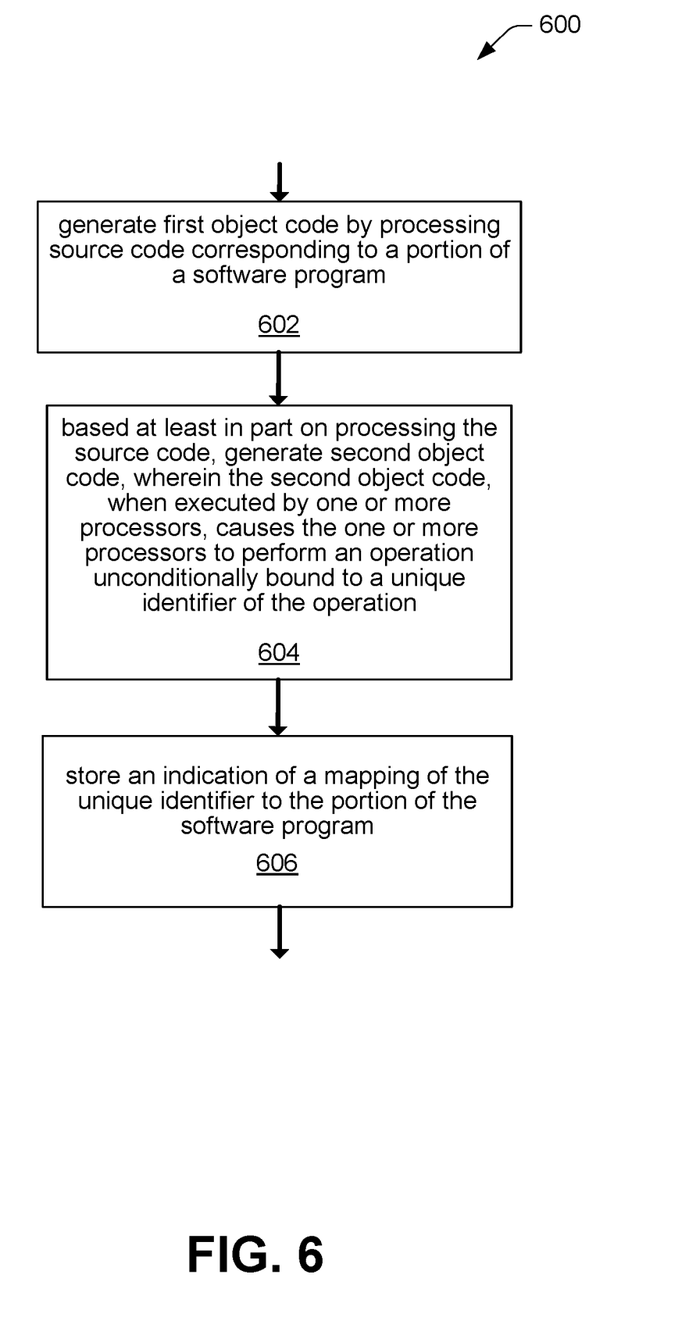
FIG. 6 is a flowchart illustrating a process that may be carried out by a compiler to generate debug operations.

FIG. 6 is a flowchart illustrating a process 600 that may be carried out by a compiler to generate debug operations. At 602, the compiler generates first object code by processing source code corresponding to a portion of a software program. For example, referring to FIG. 4, the compiler may generate object code instructions 406, including Object Code a and Object Code b, by processing source code instructions 404, including Instruction 3, Instruction 4 and Instruction 5. For example, as shown in FIG. 4, Instruction 3, Instruction 4 and Instruction 5 correspond to the Function "F."

At 604, based at least in part on processing the source code, the compiler generates second object code. The second object code, when executed by a processor, causes the processor to perform an operation unconditionally bound to a unique identifier of the operation. For example, based at least in part on generating the object code instructions 406 including Object Code a and Object Code b, the compiler may generate a debug operation such as Object Code 410, to increment a counter at a unique memory location X.

For example, the compiler (and/or linker) may encode the unique memory location X directly into the object code that corresponds to the debug operation. As another example, the machine code corresponding to the debug operation may be to output an indication, unconditionally bound to a unique identifier. For example, a compiler (and/or linker) may encode the unique identifier directly into machine code that corresponds to the debug operation. The debug operation may be to output the unique identifier, possibly along with other information.

At 606, the compiler (and/or linker) may store an indication of a mapping of the unique identifier to the portion of the software program. For example, referring still to FIG. 4, the compiler (and/or linker) may populate the bindings memory 408 with metadata indicating a mapping of the unique identifier, such as mapping the memory location X to the Function "F." Using the mapping, software debug/analysis tools 110 may process an indication associated with the unique identifier. The indication may be, for example, a counter incremented at a memory location by an operating device executing object code corresponding to a source program, or an operating device outputting an indication resulting from the operating device executing object code corresponding to the source program. Associating the unique identifier with a portion of a software program, the software debug/analysis tools 110 may process the indication to provide insight into how the operating device is executing the object code corresponding to the source program.

In some examples, the compiler generates object code for a debug operation, unconditionally bound to a unique identifier of the operation, based at least in part on processing the source code for every function in a software program. In other examples, the compiler generates object code for a debug operation, unconditionally bound to a unique identifier of the operation, based at least in part on processing the source code for selected functions in a software program. The selection of functions may be based at least in part on a configuration or input provided by a user. For example, a user may provide input that defines a configuration for the compiler to generate object code for a debug operation, unconditionally bound to a unique identifier of the operation, based at least in part on processing the source code for every function in a software program. As another example, a user may provide input that defines a configuration for the compiler to generate object code for a debug operation, unconditionally bound to a unique identifier of the operation, based at least in part on processing the source code for identified functions in a software program or for functions in a software program having certain characteristics.

In other examples, a user may provide input that defines a configuration for the compiler to generate object code for a debug operation, unconditionally bound to a unique identifier of the operation, based at least in part on processing the source code resulting in particular types of operations, such as memory access operations. In yet other examples, a user may provide input that defines a configuration for the compiler to generate object code for a debug operation, unconditionally bound to a unique identifier of the operation, based at least in part on processing the source code resulting in all operations, such that a debug operation is generated for every operation in the processed source code and/or generated object code. With the debug operation being unconditionally bound to a unique identifier, overhead may be minimized. Software debug/analysis tools 110 may use the generated mapping to correlate results of the debug operations with program source code and/or generated object code.

Figure 7:
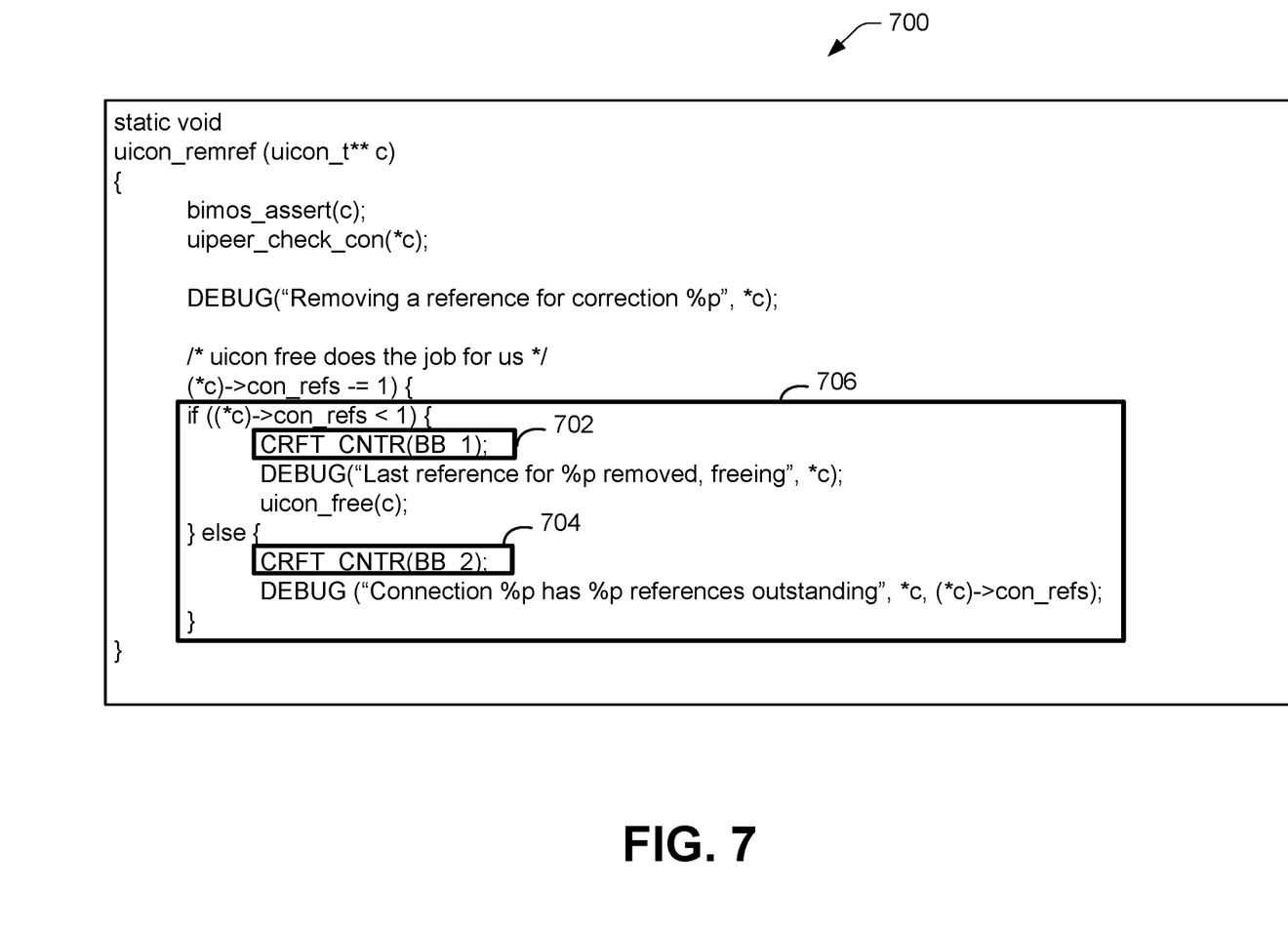
FIG. 7 illustrates example source code in which a user has provided input to identify particular source code portions of the source code for the compiler to generate object code for a debug operation, unconditionally bound to a unique identifier of the operation.

FIG. 7 illustrates example source code 700, in which a user has provided input directly into the source code 700 to identify particular source code portions of the source code 700 for the compiler to generate object code for a debug operation, unconditionally bound to a unique identifier of the operation. Referring to FIG. 7, the input includes a first inserted instruction 702 and a second inserted instruction 704. The user has included the first inserted instruction 702 in an "if" branch of an if-else source code construct 706. The user has included the second inserted instruction 704 in an "else" branch of the if-else source code construct 706.

The compiler generates object code corresponding to the "if" branch of the if-else source construct 706 and also generates object code corresponding to a debug operation, to increment a counter at a memory location that is unconditionally bound to that debug operation object code. Additionally or alternatively, the operation may be to output a unique indication that is unconditionally bound to that debug operation object code. The compiler also generates a mapping of the memory location and/or unique indication to the object code. The mapping may be used by software debug/analysis tools 110 to gain insight into the operation of an operating device executing the "if" branch object code (and the debug operation 702 object code).

The compiler also generates object code corresponding to the "else" branch of the if-else source construct 706 and also generates object code corresponding to a debug operation, to increment a counter at a memory location that is unconditionally bound to that debug operation object code. Additionally or alternatively, the operation may be to output a unique indication that is unconditionally bound to that debug operation object code. The compiler also generates a mapping of the memory location and/or unique indication to the debug operation object code. The mapping may be used by software debug/analysis tools to gain insight into the operation of an operating device executing the "else" branch object code (and the debug operation 704 object code).

FIG. 7 illustrates that user input to the compiler may be provided directly into source code. Additionally and/or alternatively, user input to the compiler may be provided in other ways, such as within a configuration file utilized by the compiler during a compilation process or via a user interface.

Figure 8:
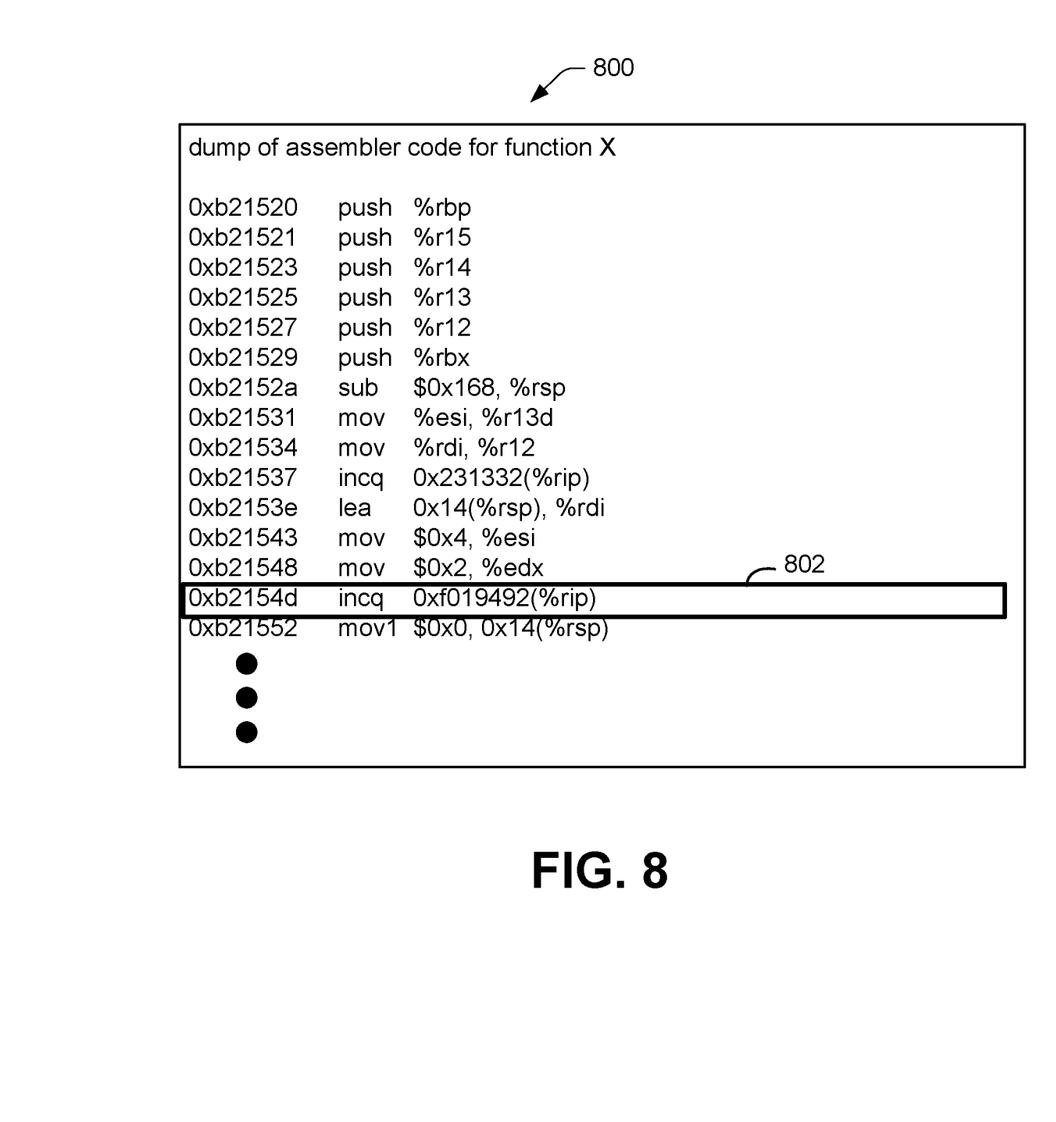
FIG. 8 is a dump listing of object code corresponding to a function "X," and including object code for a debug operation.

As mentioned above, in some configurations, a compiler may generate object code for a debug operation, unconditionally bound to a unique identifier of the operation, based at least in part on processing source code resulting in particular types of operations, such as memory access operations. FIG. 8 is a dump listing 800 of object code corresponding to a function "X," and including object code 802 for such a debug operation. In the case of the object code 802, the debug operation is an instruction to increment a counter. As with the debug operations that have already been discussed, the compiler generates the debug operation 802 to be unconditionally bound to a unique identifier of the operation. The compiler also generates a mapping of the unique identifier to the debug operation object code. The compiler may be configured to insert a corresponding debug operation for every memory access in object code that the compiler generates.

Figure 9:
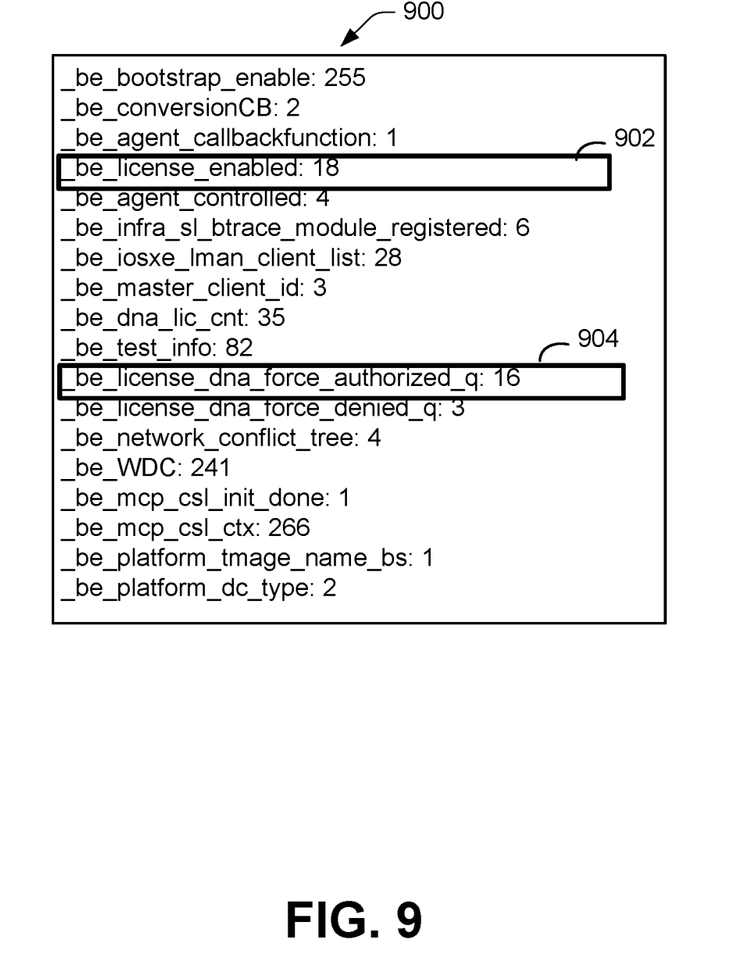
FIG. 9 is an example of a listing that may be generated by a software debug/analysis tool processing results generated by an operating device executing object code that includes a debug operation for every memory access.

FIG. 9 is an example of a listing 900 that may be generated by a software debug/analysis tool 110 processing results generated by an operating device 102 executing object code that includes a debug operation for every memory access. The software debug/analysis tool 110 may also process mappings generated by a compiler in the process of compiling source code to generate the object code executed by the operating device. The mappings map a unique identifier of the debug operation, such as a memory location at which a counter is stored, to a portion of the source code to which the unique identifier is bound.

As shown in the FIG. 9 listing 900, as an example 902, the software debug/analysis tool 110 generates an entry for the "license_enabled" memory location variable indicating that the variable has been accessed eighteen times. Another example 904 shows the software debug/analysis tool 110 generates an entry for the "license_dna_force_authorized_q" memory location variable indicating the variable has been accessed sixteen times.

Figure 10:
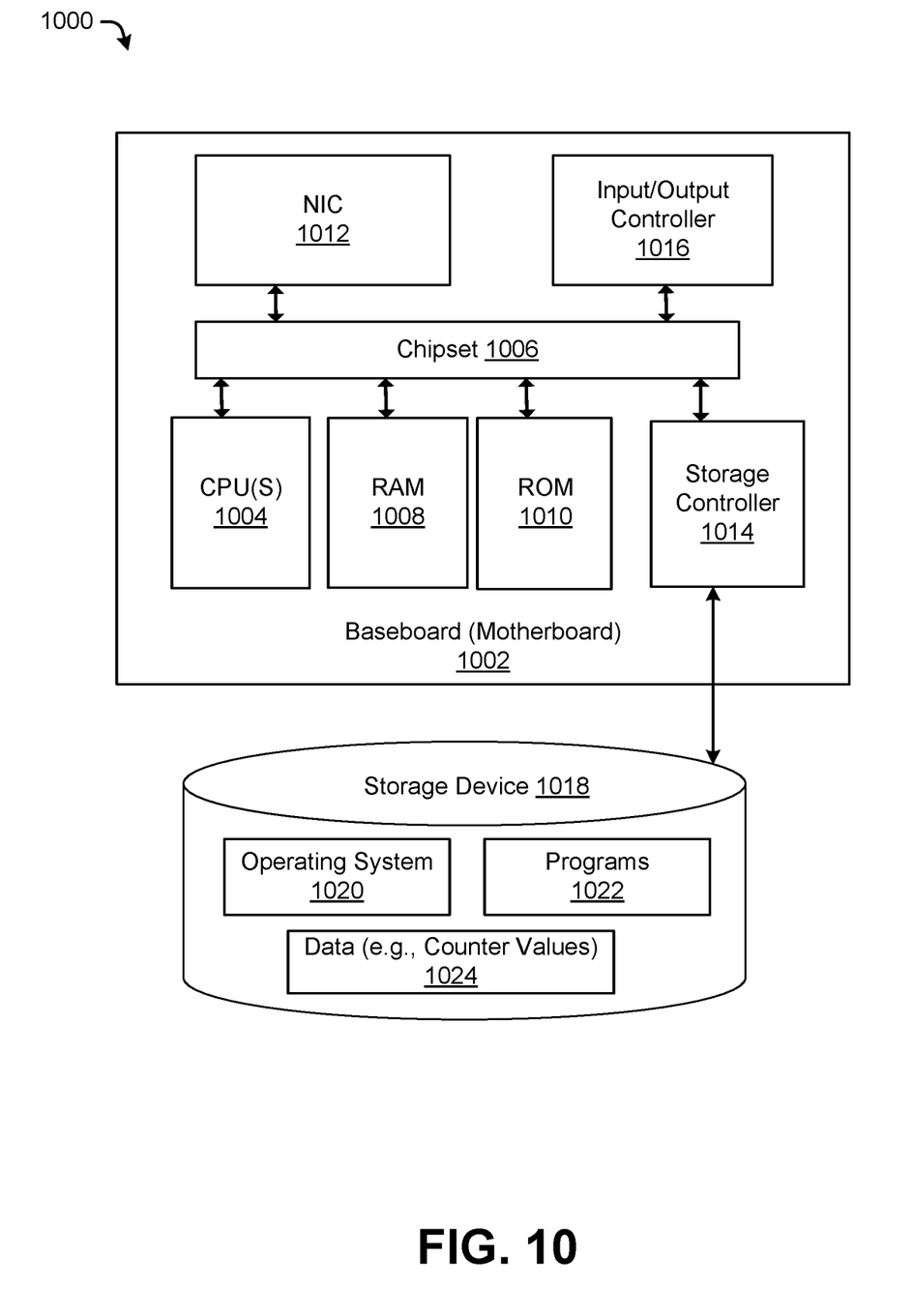
FIG. 10 illustrates an example computer architecture for a computer capable of executing program components for implementing the functionality described herein.

FIG. 10 illustrates an example computer architecture for a computer 1000 capable of executing program components for implementing the functionality described above. The computer architecture shown in FIG. 10 illustrates an architecture of a server computer, workstation, desktop computer, laptop, tablet, network appliance, e-reader, smartphone, network switch, or other computing device, and can be utilized to execute any of the software components presented herein. The computer 1000 may, in some examples, correspond to a network infrastructure device discussed herein.

The computer 1000 includes a baseboard 1002, or "motherboard," which may be a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be, for example, standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein. As illustrated in FIG. 10, the ROM 1010 or NVRAM can also store data usable by the computer 1000 to generate and/or process attestation information in messages exchanged among the computer 1000 and other devices. In other examples, this data may be stored elsewhere, such as in RAM 1008.

The computer 1000 can operate in a networked environment using logical connections to remote computing devices and computer systems through a network. For example, the chipset 1006 can include functionality for providing network connectivity through a Network Interface Controller (NIC) 1012, such as a gigabit Ethernet adapter. The NIC 1012 can connect the computer 1000 to other computing devices over a network. It should be appreciated that multiple NICs 1012 can be present in the computer 1000, connecting the computer to other types of networks and remote computer systems. In some instances, the NICs 1012 may include at least one ingress port and/or at least one egress port. An input/output controller 1016 may be provided for other types of input/output.

The computer 1000 can be connected to a storage device 1018 that provides non-volatile storage for the computer. The storage device 1018 can store an operating system 1020, programs 1022, and data 1024, for example counter values that the one or more processors increments when a function is executed. The storage device 1018 can be connected to the computer 1000 through a storage controller 1014 connected to the chipset 1006. The storage device 1018 can include one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1018 is characterized as primary or secondary storage, and the like. For example, the computer 1000 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the storage device 1018 by detecting the physical states or characteristics of one or more particular locations within the physical storage units.

In addition to the storage device 1018 described above, the computer 1000 can have access to other computer-readable storage media to store and retrieve information, such as program modules, data structures, or other data, including data to generate and/or process attestation information. It should be appreciated by those skilled in the art that computer-readable storage media is any available media that provides for the non-transitory storage of data and that can be accessed by the computer 1000.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method of generating object code corresponding to source code for a portion of a software program, the method comprising:

receiving, by a compiler, input defining a configuration of a debug operation to be generated based at least in part on processing a type of operation associated with a function included in the portion of the software program;

processing, by the compiler, the source code;

generating, by the compiler and based on processing the source code, first object code associated with the function in the source code;

determining, by the compiler, the type of operation associated with the function;

in response to processing the source code and determining the type of operation associated with the function, generating, by the compiler, second object code, the second object code including the debug operation that is unconditionally bound to a unique identifier of the debug operation, wherein the second object code, when executed by one or more processors, causes the one or more processors to perform at least the debug operation; and generating, by the compiler and in a bindings memory, an indication of a mapping of the unique identifier to the function in the source code.

2. The method of claim 1, wherein the second object code is executed at a time prior to a portion of the first object code being executed.

3. The method of claim 1, wherein:
the second object code is generated based at least in part on a memory access instruction in the first object code.

4. The method of claim 1, wherein the input further defines additional configurations of the debug operation to be generated based at least in part on processing one or more additional types of operations associated with one or more additional functions included in the portion of the software program.

5. The method of claim 1, wherein:
the debug operation is to increment a counter at a memory location;
an identifier of the memory location is the unique identifier of the debug operation; and
the identifier of the memory location is encoded directly into the second object code.

6. The method of claim 1, wherein:
the debug operation is to output a message including the unique identifier of the debug operation.

7. The method of claim 1, wherein:
generating the second object code is based at least in part on a configuration definition.

8. The method of claim 1, wherein:
the indication of the mapping of the unique identifier to the portion of the software program is generated according to a predetermined pattern based at least in part on a name of the function in the source code.

9. The method of claim 1, wherein the source code is a conceptually modified source code, the conceptually modified source code including a declaration portion and a declaration statement associated with the debug operation.

10. The method of claim 1, wherein the unique identifier is a globally unique identifier.

11. One or more non-transitory computer-readable storage media storing computer-readable instructions that, when executed, instruct one or more processors to perform operations for compiling source code corresponding to a portion of a software program, comprising:

receiving, by a compiler, input defining a configuration of a debug operation to be generated based at least in part on processing a type of operation associated with a function included in the portion of the software program;

processing, by the compiler, the source code;

generating, by the compiler, based on processing the source code, first object code associated with the function;

determining, by the compiler, the type of operation associated with the function;

in response to processing the source code and determining the type of operation, generating, by the compiler, second object code, the second object code including the debug operation that is unconditionally bound to a unique identifier of the debug operation, wherein the second object code, when executed by one or more processors, causes the one or more processors to perform at least the debug operation; and generating, by the compiler and in a bindings memory, an indication of a mapping of the unique identifier to the portion of the software program.

12. The one or more non-transitory computer-readable storage media of claim 11, wherein the second object code is executed at a time prior to a portion of the first object code being executed.

13. The one or more non-transitory computer-readable storage media of claim 11, wherein:
the second object code is generated based at least in part on a memory access instruction in the first object code.

14. The one or more non-transitory computer-readable storage media of claim 11, wherein:
the debug operation is to increment a counter at a memory location;
an identifier of the memory location is the unique identifier of the debug operation; and
the identifier of the memory location is encoded directly into the second object code.

15. The one or more non-transitory computer-readable storage media of claim 11, wherein:
the debug operation is to output a message including the unique identifier of the debug operation.

16. The one or more non-transitory computer-readable storage media of claim 11, wherein:
the indication of the mapping of the unique identifier to the portion of the software program is generated according to a predetermined pattern based at least in part on a name of the function in the source code.

17. A system comprising:
one or more processors; and
one or more non-transitory computer-readable media storing computer-executable instructions that, when executed by the one or more processors, cause the one or more processors to perform operations comprising:

receiving, by a compiler, input defining a configuration of a debug operation to be generated based at least in part on processing a type of operation associated with a function included in the portion of the software program;

processing, by the compiler, the source code;

generating, by the compiler and based on processing the source code, first object code associated with the function in the source code;

determining, by the compiler, the type of operation associated with the function;

in response to processing the source code and determining the type of operation associated with the function, generating, by the compiler, second object code, the second object code including the debug operation that is unconditionally bound to a unique identifier of the debug operation, wherein the second object code, when executed by one or more processors, causes the one or more processors to perform at least the debug operation; and generating, by the compiler and in a bindings memory, an indication of a mapping of the unique identifier to the function in the source code.

18. The system of claim 17, wherein:

the debug operation is to increment a counter at a memory location;

an identifier of the memory location is the unique identifier of the debug operation; and the identifier of the memory location is encoded directly into the second object code.

19. The system of claim 17, wherein:

the operations further include outputting a message including the unique identifier of the debug operation.

20. The system of claim 17, wherein:

the second object code corresponds to a debug instruction included in the source code.

\* \* \* \* \*